United States Patent
Cheng et al.

(10) Patent No.: US 8,145,733 B1
(45) Date of Patent: Mar. 27, 2012

(54) IDENTIFICATION OF COMPUTERS LOCATED BEHIND AN ADDRESS TRANSLATION SERVER

(75) Inventors: Hsu Yu Cheng, Shindian (TW); Hsu Wei Chiang, Taichung (TW)

(73) Assignee: Trend Micro Incorporated, Tokyo (JP)

( * ) Notice: Subject to any disclaimer, the term of this patent is extended or adjusted under 35 U.S.C. 154(b) by 657 days.

(21) Appl. No.: 11/355,728

(22) Filed: Feb. 15, 2006

(51) Int. Cl.
*G06F 15/177* (2006.01)
(52) U.S. Cl. ......... 709/220; 709/224; 709/227; 709/245
(58) Field of Classification Search .................. 709/203, 709/217, 219, 228, 237, 238, 245
See application file for complete search history.

(56) References Cited

U.S. PATENT DOCUMENTS

| | | | |
|---|---|---|---|
| 6,393,487 B2 | 5/2002 | Boucher et al. | |
| 6,587,874 B1 | 7/2003 | Golla et al. | |
| 6,779,004 B1 | 8/2004 | Zintel | |
| 6,892,230 B1 | 5/2005 | Gu et al. | |
| 2003/0110379 A1* | 6/2003 | Ylonen et al. | 713/164 |
| 2003/0212795 A1* | 11/2003 | Harris et al. | 709/227 |
| 2004/0004968 A1* | 1/2004 | Nassar | 370/401 |
| 2004/0073704 A1* | 4/2004 | Paunikar et al. | 709/245 |
| 2004/0243703 A1* | 12/2004 | Demmer et al. | 709/224 |
| 2005/0015496 A1* | 1/2005 | Guo et al. | 709/227 |
| 2005/0105524 A1* | 5/2005 | Stevens et al. | 370/389 |

\* cited by examiner

*Primary Examiner* — Barbara Burgess
(74) *Attorney, Agent, or Firm* — Okamoto & Benedicto LLP (57) ABSTRACT

In one embodiment, a Network Address Translation (NAT) server performs address translation services for client computers in a private computer network. A traffic monitor computer outside the private computer network may receive network data processed by the NAT server. The traffic monitor computer may parse network data to obtain application layer information, from which the traffic monitor computer may obtain identification information of the client computer that originally sent the network data. The identification information may include the private IP address of the client computer. In one embodiment, the traffic monitor computer obtains the private IP address of the client computer by examining trace information appended to an e-mail by a mail client running in the client computer.

15 Claims, 5 Drawing Sheets

```
Received: from udb2.sparqnet.net (udb2.sparqnet.net [211.78.130.234])
    by mx135.hinet.net (8.8.8/8.8.8) with SMTP id WAA22090
    for <steven.hsu999@msa.hinet.net>; Thu, 6 Oct 2005 22:02:18 +0800 (CST)
Received: from 218.32.230.100
    by udb2.sparqnet.net with Mail2000 ESMTP Server V3.20M(413:5:AUTH_RELAY)
    (envelope-from <hercules@crmonweb.com>); Thu, 06 Oct 2005 21:43:43 +0800 (CST)
Received: from HerculesM24 ([192.168.102.104])
    (authenticated)
    by crmonweb.com (8.11.6/8.11.6) with ESMTP id j96DpLp05304;
    Thu, 6 Oct 2005 21:51:21 +0800
From: =?big5?B?pGqkT6Ro?= <hercules@crmonweb.com>
To: <hercules@crmonweb.com>
Subject: =?big5?B?Rlc6IMHCvHmucA==?=
Date: Thu, 6 Oct 2005 21:47:19 +0800
Message-ID: <INEHLHLFBOOLHOMFBKINKEPECGAA.hercules@crmonweb.com>
MIME-Version: 1.0
Content-Type: multipart/mixed;
    boundary="----=_NextPart_000_001D_01C5CABF.86BFACC0"
X-Priority: 3 (Normal)
X-MSMail-Priority: Normal
X-Mailer: Microsoft Outlook IMO, Build 9.0.6604 (9.0.2911.0)
X-MimeOLE: Produced By Microsoft MimeOLE V6.00.2800.1506
Importance: Normal
Content-Length: 1604491
Status:
```

IDENTIFICATION OF COMPUTERS LOCATED BEHIND AN ADDRESS TRANSLATION SERVER

BACKGROUND OF THE INVENTION

1. Field of the Invention

The present invention relates generally to computer networks, and more particularly but not exclusively to monitoring of computer network traffic.

2. Description of the Background Art

Computer viruses, worms, Trojans, and spyware are examples of malicious codes that have plagued computer systems throughout the world. Although there are technical differences between each type of malicious code, malicious codes are commonly collectively referred to as "viruses."

Various antivirus products for protecting a computer network from viruses are commercially available. These antivirus products may be implemented in software, hardware, or combination of both. When an antivirus product finds a virus in data transmitted over the network, the antivirus product needs to identify the computer that originally transmitted the data. This way, the network administrator or some alerting mechanism may be notified of the possibly infected computer for virus scanning and removal or other remedial step.

If the infected computer is behind a Network Address Translation (NAT) server, identification of the infected computer is problematic because the NAT server does not use the infected computer's IP address when communicating with computers on the other side of the NAT server. Therefore, a traffic monitor working with an antivirus product on the other side of the NAT server will not be able to particularly identify the infected computer. Moving the traffic monitor on the same side of the NAT server as the infected computer does not really address the issue because there may be more than one NAT server in the network. That is, this approach will require multiple traffic monitors when employed in computer networks with multiple NAT servers.

A NAT server maintains a NAT table for keeping track of computer communication sessions. A traffic monitor may get a copy of the NAT table to identify the infected computer. A problem with this approach is that some NAT tables are maintained using a dynamic mechanism, making it difficult to trace the source of virus infected network data.

SUMMARY

In one embodiment, a Network Address Translation (NAT) server performs address translation services for client computers in a private computer network. A traffic monitor computer outside the private computer network may receive network data processed by the NAT server. The traffic monitor computer may parse network data to obtain application layer information, from which the traffic monitor computer may obtain identification information of the client computer that originally sent the network data. The identification information may include the private IP address of the client computer. In one embodiment, the traffic monitor computer obtains the private IP address of the client computer by examining trace information appended to an e-mail by a mail client running in the client computer.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
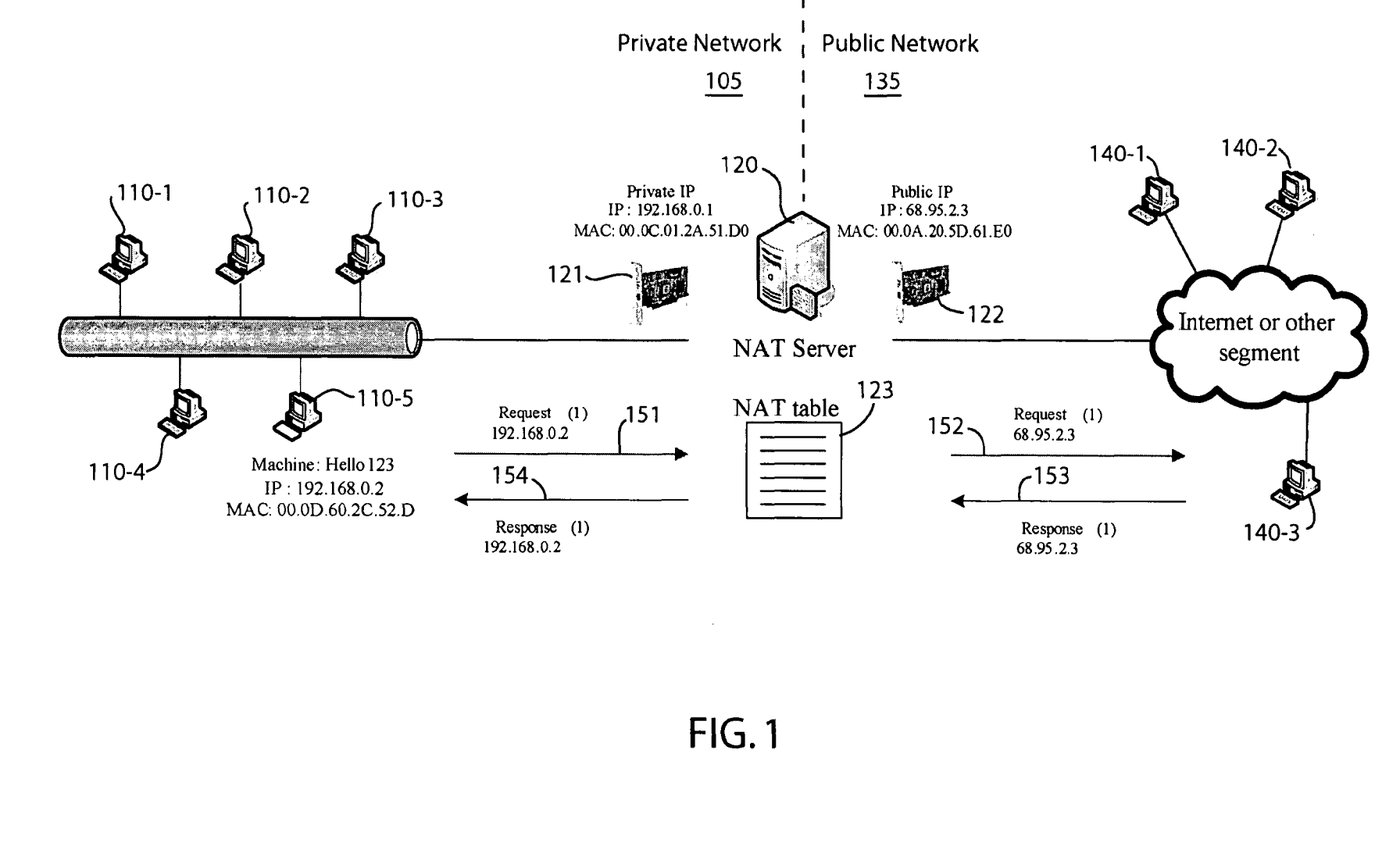
FIG. 1 schematically shows an example computing environment where embodiments of the present invention may be employed.

FIG. 1 schematically shows an example computing environment where embodiments of the present invention may be employed. The environment of FIG. 1 includes a private network 105 and a public network 135. The private network 105 includes multiple computers 110 (i.e., 110-1, 110-2, . . . ), which may be desktop or server computers. The computers 110 may be coupled together in an Intranet, for example. The public network 135 may comprise the Internet or other public network. The public network 135 includes computers 140 (i.e., 140-1, 140-2, . . . ), which may be desktop or server computers belonging to other private networks, for example. As another example, a computer 140 may comprise a website. Each computer 110 communicates with computers (e.g., computers 140) in the public network 135 through a Network Address Translation (NAT) server computer 120. The computers 110 are "behind" the NAT server computer 120 in that the computers 110 communicate to computers outside the private network 105 by way of the NAT server computer 120.

Figure 2:
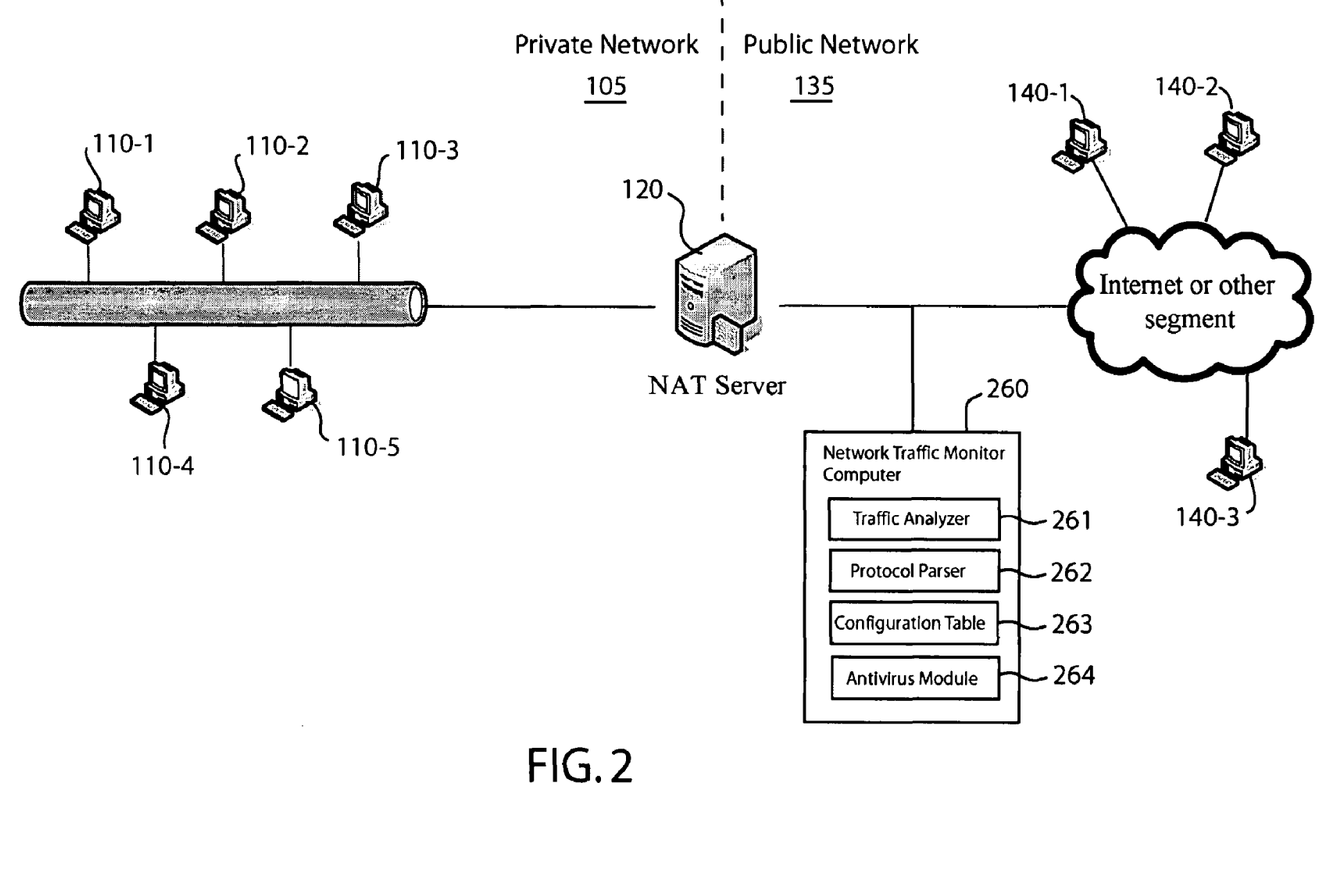
FIG. 2 shows the computing environment of FIG. 1 with the addition of a network traffic monitor computer in accordance with an embodiment of the present invention.

In one embodiment, computers and other network components in the environment of FIG. 2 perform network communication in accordance with the Open System Interconnect (OSI) seven-layer model. As is well known, the OSI seven-layer model uses what is referred to as the "OSI protocol stack." The OSI protocol stack has seven layers with the physical layer on layer 1, the data link layer on layer 2, the network layer on layer 3, the transport layer on layer 4, the session layer on layer 5, the presentation layer on layer 6, and the application layer on layer 7. In the OSI protocol stack, layer 1 is the lowest layer and layer 7 is the highest. The application layer, layer 7, is so named because it is the level at which application programs operate. That is, layer 7 data is understandable to application programs, such as e-mail clients and e-mail servers, for example. The OSI protocol stack, in general, is well known in the art and thus not further described here.

The NAT server computer 120 provides address translation services between computers in the private network 105 and computers in the public network 135. The functionality of the NAT server computer 120 may be implemented in a router, for example. The NAT server computer 120 may comprise a network interface card 121 for the private network 105 and a network interface card 122 for the public network 135. Network interface cards 121 and 122 are electrically coupled to hardware components (e.g., motherboard) inside the NAT server computer 120 but are depicted separately in FIG. 1 for illustration purposes. The NAT server computer 120 communicates with computers in the private network 105 using the network interface card 121, and with computers in the public network 135 using the network interface card 122.

The NAT server computer 120 allows the private network 105 to conserve Internet Protocol (IP) addresses by using the network interface card 122 for communications outside the private network 105. That is, each computer 110 communicating with a computer in the public network 135 may be identified in the public network 135 by the computer 110's public IP address, which is that of the network interface card 122. Within the private network 105, each computer 110 may communicate using its private IP address, which is the IP address of its own network interface card. The IP addresses of the computers 110 may be assigned by a DHCP server (not shown), for example. For example, a computer 110 communicates with the NAT server computer 120 using the computer 110's private IP address. The NAT server computer 120 may use different port numbers for the same public IP address to be able to identify particular communication sessions between computers 110 and 140. The NAT server computer 120 maintains a NAT table 123 to keep track of matching private and public IP addresses. The NAT table 123 thus allows the NAT server computer 120 to identify the destination computer for particular network data.

An example communication session in the environment of FIG. 1 is now described. In the example of FIG. 1, the network interface card 121 has an IP address of 192.168.0.1 and a Media Access Control (MAC) address of 00.0C.01.2A.51.D0, the network interface card 122 has an IP address of 68.95.2.3 and a MAC address of 00.0A.20.5D.61.E0, and the computer 110-5 has an IP address of 192.168.0.2, a MAC address of 00.0D.60.2C.52.D, and a machine name of "Hello123." Generally speaking, a MAC address is a unique code permanently assigned to a particular piece of networking hardware, while a machine name is another identifier of a computer on a network. The machine name may be assigned by the administrator to the computer when the computer is coupled to the network.

Still referring to FIG. 1, the computer 110-5 sends a connection request (see arrow 151) using its private IP address, which is 192.168.0.2, to the computer 140-3 in the public network 135. The computer 110-5 may use any available port number, such as port 1899, for example. Thus, the request by the computer 110-5 will have a source IP address of 192.168.02, a source port number of 1899, a destination IP address reflecting that of the computer 140-3, and a destination port 80 of the computer 140-3. The NAT server computer 120 receives and forwards the request but replaces the private IP address of the computer 110-5 with that of the network interface card 122 (see arrow 152), which is 68.95.2.3. The NAT server computer 120 provides an available port for the request, say port 1334. The request as forwarded by the NAT server computer 120 will thus have a source IP address of 68.95.2.3, a source port number of 1334, a destination IP address reflecting that of the computer 140-3, and a destination port 80 of the computer 140-3. The NAT server computer 120 keeps track of these IP addresses and port numbers in the NAT table 123.

Because of the address translation performed by the NAT server computer 120, the computer 140-3 receives the request originated by the computer 110-5 but sees the public IP address of the computer 110-5 instead of its private IP address. The computer 140-3 thus responds to the request (see arrow 153) by sending a response to the public IP address of the computer 110-5. The NAT server receives the response, which has a source IP address reflecting that of the computer 140-3, a source port number 80, a destination IP address of 68.95.2.3 (IP address of network interface card 122, which is the public IP address of the computer 110-5), and a destination port number of 1334. The NAT server computer 120 consults the NAT table 123 and determines that the response is for the computer 110-5. Accordingly, the NAT server computer 120 forwards the response (see arrow 154) to the IP address 192.168.0.2 at port 1899, which is the private IP address of and port number used by the computer 110-5.

The address translation performed by the NAT server computer 120 prevents a conventional traffic monitor in the public network 135 to readily particularly identify the original source of network data coming from the private network 105. That is, network data coming from the private network 105 will appear to be originally from the NAT server computer 120. A problem arises when the traffic monitor identifies virus-infected network data coming from the private network 105. In that case, the traffic monitor may not be able to identify which of the computer 110 originally sent the network data. Even if the traffic monitor has access to the NAT table 123, identifying the possibly infected computer 110 is not trivial because some NAT tables are maintained using a dynamic mechanism, making it difficult to trace the source of a particular network data. Placing the traffic monitor behind the NAT server computer 120 solves the problem for computers 110, but not for other computers in the private network 105 that are behind a separate NAT server. In that case, one traffic monitor is needed for each NAT server, making this approach a costly proposition.

FIG. 2 shows the computing environment of FIG. 1 with the addition of a network traffic monitor computer 260 in accordance with an embodiment of the present invention. The traffic monitor computer 260 may deployed after the NAT server computer 120, which in the example of FIG. 2 is in the public network 135. Note that the traffic monitor computer 260 may also be deployed within the private network 105, especially in applications where there are there multiple NAT servers in the same network. In that case, a single traffic monitor computer 260 may be deployed after the outermost (i.e., closest to the public network 135) NAT server.

The traffic monitor computer 260 may include components for monitoring and analyzing data transmitted over a computer network. For example, the traffic monitor computer 260 may include a network interface card, network driver software, a network communication protocol stack (e.g., OSI seven-layer protocol stack), and a protocol parsing application. The functionality of the traffic monitor computer 260 may be implemented in a separate, standalone computer as shown in FIG. 2 or integrated with other computers. Being computer related, the components of the traffic monitor computer 260 may be implemented in hardware, software, or a combination of both. Software implementations may be in the form of computer-readable program code stored in a computer-readable storage medium. Computer-readable program code may be read or executed by a processor.

In the example of FIG. 2, the traffic monitor computer 260 includes a traffic analyzer 261, one or more protocol parsers 262, a configuration table 263, and an antivirus module 264. In one embodiment, the traffic analyzer 262 comprises computer-readable program code for receiving network data (i.e., data transmitted over the network), analyzing the network data to identify computers in the network, and maintaining identification information of computers identified to be in the network. The traffic monitor computer 260 may monitor network data transmitted from the private network 105 to the public network 135, and forward a copy of the network data to the traffic analyzer 261 for analysis. The traffic analyzer 261 may employ a protocol parser 262 to parse the network data, analyze the parsed network data to identify the computer 110 that originally transmitted the network data, and update the configuration table 263 with identification information (e.g., IP address, machine name, etc.) of the identified computer 110. In one embodiment, the traffic analyzer 261 analyzes the network data at layer 7 of the OSI protocol stack to identify the original source of the network data.

A protocol parser 262 may comprise computer-readable program code for parsing network data in accordance with a network communication protocol. A protocol parser 262 may comprise a Simple Mail Transfer Protocol (SMTP) parser, a Hyper Text Transfer Protocol (HTTP) parser, a File Transfer Protocol (FTP) parser, or other protocol parser depending on the application. The traffic monitor computer 260 may include more than one protocol parsers 262, one for each protocol. A protocol parser 262 may parse network data at level 7 of the OSI protocol stack. It is to be noted that protocol parsing at various layers of the OSI protocol stack, in general, is well known.

The configuration table 263 may comprise computer-readable information about computers identified as being in a segment of a computer network. In one embodiment, the configuration table 263 includes identifying information of computers 110 identified as being in the private network 105. The identifying information may include the IP address and machine name of each of the identified computers, for example. The configuration table 263 may also include identifying information of the NAT server providing address translation services for the identified computers.

The antivirus module 264 may comprise computer-readable program code for scanning data for computer viruses. The antivirus module 264 may be a commercially available antivirus program, such as those offered by Trend Micro, Inc., for example. The antivirus module 264 may be employed to determine if received network data is infected with a virus. If so, the traffic analyzer 261 may identify the computer from which the network data was originally transmitted, and so alert the network administrator. The network administrator may then perform virus scanning and removal actions on the identified computer, for example.

Other components shown in FIG. 2 have already been discussed in connection with FIG. 1.

In one embodiment, the traffic monitor computer 260 monitors e-mails transmitted from within the private network 105. Accordingly, in this embodiment, the protocol parser 262 comprises an SMTP protocol parser. The traffic monitor computer 260 may assemble a sufficient number of network data such that the protocol parser 262 can parse the network data to assemble layer 7 STMP data. The traffic analyzer 261 may extract information from the layer 7 SMTP data to identify the computer 110 that originally sent the e-mail.

Figure 3:
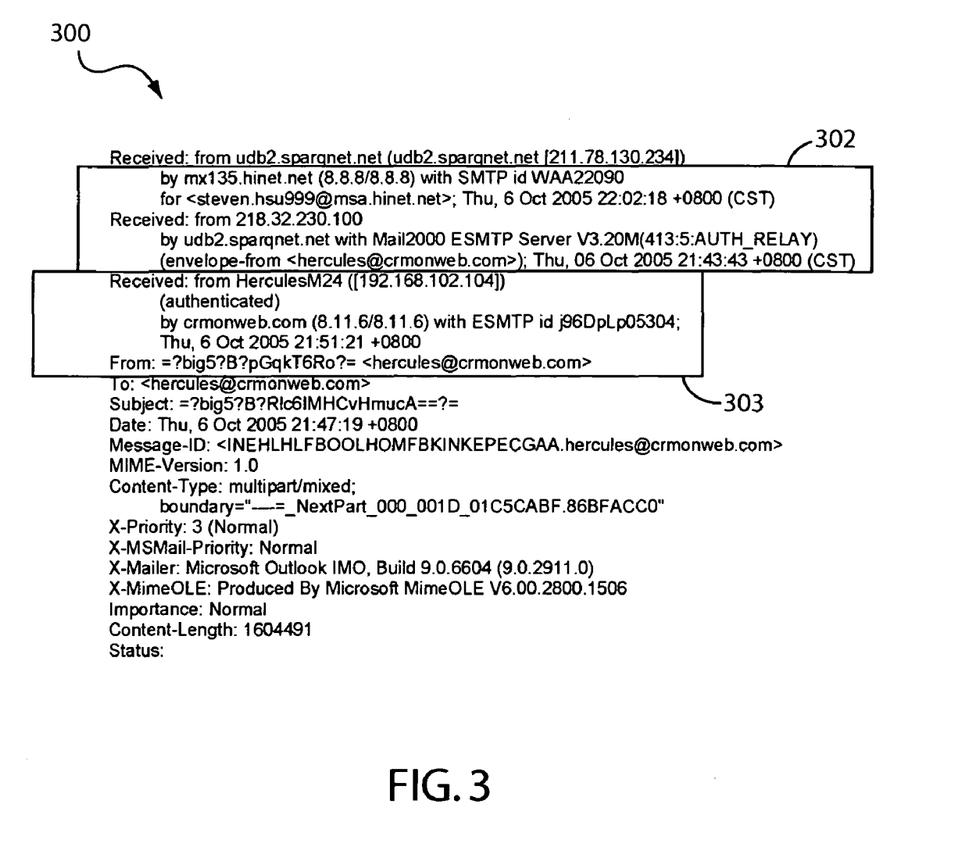
FIG. 3 shows an example layer 7 SMTP data that may be analyzed by a traffic analyzer in the traffic monitor computer of FIG. 2.

FIG. 3 shows an example layer 7 SMTP data 300 that may be analyzed by the traffic analyzer 261. In one embodiment, the traffic analyzer 261 looks at the portions of the SMTP data 300 labeled as 302 and 303 to identify the computer that originally transmitted the e-mail. Portion 302 includes header information that identifies the e-mail address of the recipient (steven.hsu999@msa.hinet.net), the sender's e-mail address (hercules@crmonweb.com), the domain name of the sender's mail server (udb2.sparqnet.net), the IP address of the sender's mail server (218.32.230.100), and when the e-mail was received by the sender's mail server (Thu, 6 Oct 2005 22:02:18+0800 (CST)). The portion 302 is also referred to as "mail server trace information" and is typically appended to the e-mail by most mail servers, such as the Microsoft Exchange™ mail server, for example.

The portion 303 includes header information that identifies the machine name of the sender's computer (HerculesM24) and the IP address of the sender's computer (192.168.102.104). The portion 303 is also referred to as "mail client trace information" and is typically appended to the e-mail by the mail client, such as the Microsoft Outlook™ or the Microsoft OutlookExpress™ mail client, employed by the sender and running in the sender's client computer.

In one embodiment, the traffic analyzer 261 examines the mail client trace information (i.e. portion 303) and the mail server trace information (i.e. portion 302) to determine the machine name, the IP address, or both of the computer that originally sent the e-mail. The mail client trace information and the mail server trace information are application layer information, and are thus not affected by a NAT server's address translation. The traffic analyzer 261 may keep track of identified computers in the configuration table 263. By monitoring traffic on the network for a period of time, the traffic analyzer 261 may build a relatively comprehensive list of computers on the network, even if those computers are behind a NAT server. This advantageously allows the traffic analyzer 261 to particularly identify the source of virus-infected network data.

Figure 4:
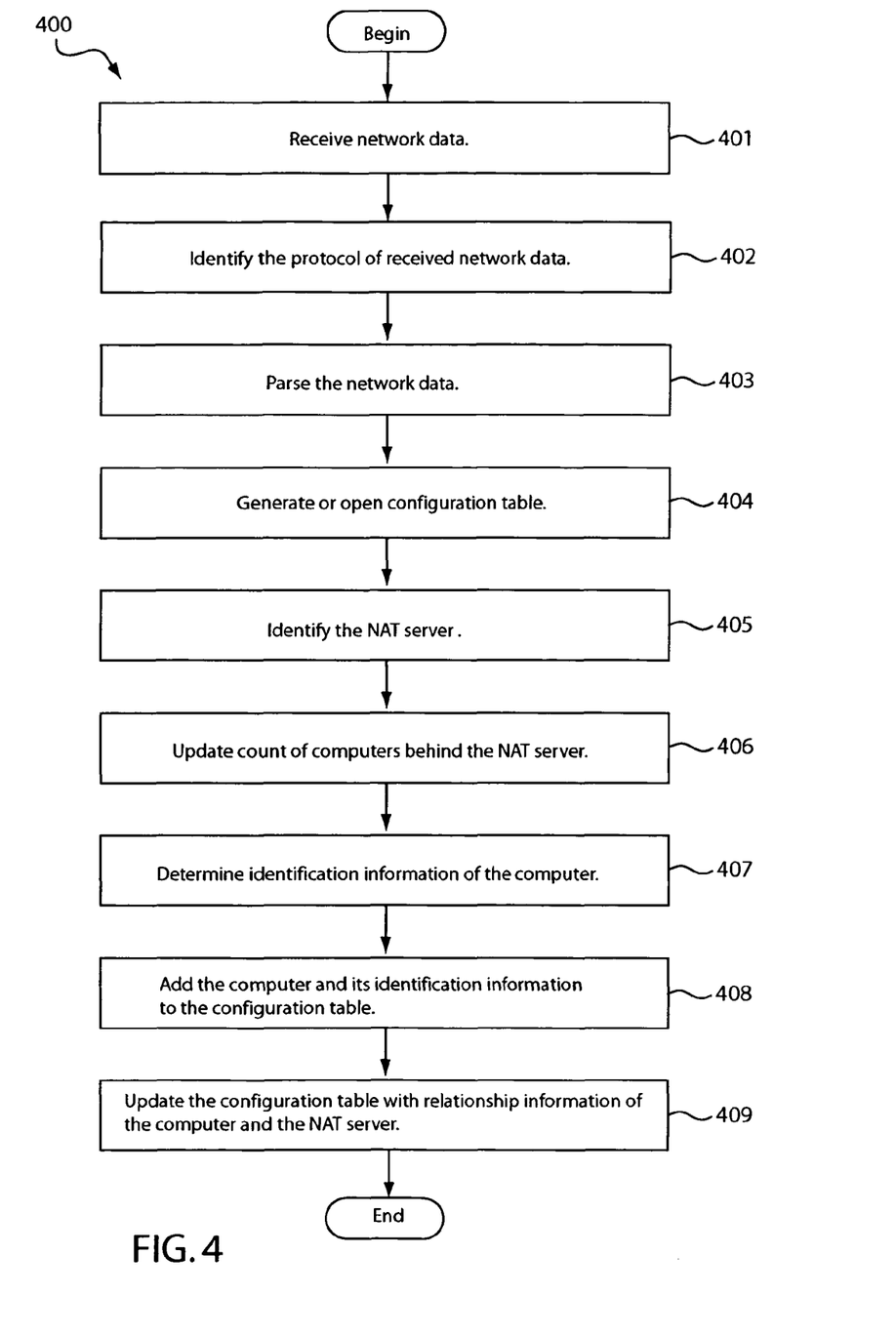
FIG. 4 shows a flow diagram of a method of determining identification information of computers behind an address translation server in accordance with an embodiment of the present invention.

FIG. 4 shows a flow diagram of a method 400 of determining identification information of computers behind an address translation server in accordance with an embodiment of the present invention. The method 400 is described herein using the components shown in FIG. 2 for illustration purposes only. It should be understood that the method 400 may also be performed using other components without detracting from the merits of the present invention.

In step 401, network data transmitted by a computer 110 through the NAT server 120 is received in the network traffic monitor computer 260. The network data may be in packets that are buffered in the network traffic monitor computer 260 so that a sufficient number is collected for analysis purposes. In one embodiment, the network data is transmitted over the computer network in accordance with the OSI seven-layer model.

In step 402, the traffic analyzer 261 determines the protocol of the network data. The protocol of the network data may be identified by examining layer 4 session information of the network data, for example.

In step 403, after the protocol of the network data is identified, the network data is parsed using the appropriate protocol parser 262. In one embodiment, the network data is parsed to form application layer data. For example, assuming the network data uses the SMTP protocol, an SMTP protocol parser may be used to parse the network data to form layer 7 (i.e., application layer) SMTP data.

In step 404, a configuration table 263 is generated or, if already generated, opened.

In step 405, the NAT server computer 120 is identified. In one embodiment, the IP address of the NAT server computer 120 is determined from layer 2 or layer 3 information of the network data.

In step 406, the count of the number of computers 110 behind the NAT server computer 120 is updated. From the application layer data formed in step 403, the particular computer 110 that originally sent the network data may be identified. The configuration table 263 may be checked whether or not the particular computer 110 has previously been identified. If not, the particular computer 110 may be added to the configuration table 263. The number of computers 110 in the configuration table 263 represents an approximate, but reasonably reliable, count of computers 110 behind the NAT server computer 120. With widespread use of e-mails and web surfing, it is likely that most computers 110 behind the NAT server computer 110 will sooner or later transmit data over the network. The count of the number of computers 110 behind the NAT server computer 120 may be used for various purposes including inventory, network security, product licensing (e.g., when the cost of the license depends on the number of computers on the network), and so on.

In step 407, identification information of the computer 110 that originally sent the network data is determined. In one embodiment, the identification information comprises the IP address and the machine name of the computer 110. The identification information of the computer 110 may be determined by examining layer 7 information of the network data, for example. In one embodiment where the network data comprises e-mail, the identification information of the computer 110 may be determined from mail client and mail server trace information appended to the e-mail.

In step 408, the identified computer 110 and its identification information are added to the configuration table 263. In one embodiment, the IP address and machine name of the computer 110 are entered in the configuration table 263.

In step 409, the configuration table 263 is updated with information relating the identified computer 110 with the NAT server computer 120. For example, the IP address of the NAT server computer 120 may be entered in the configuration table 263 along with the identification information of the computer 110 to identify the NAT server computer 120 as providing translation services for the computer 110. This advantageously allows for searching of identification information of computers behind a particular NAT server.

Figure 5:
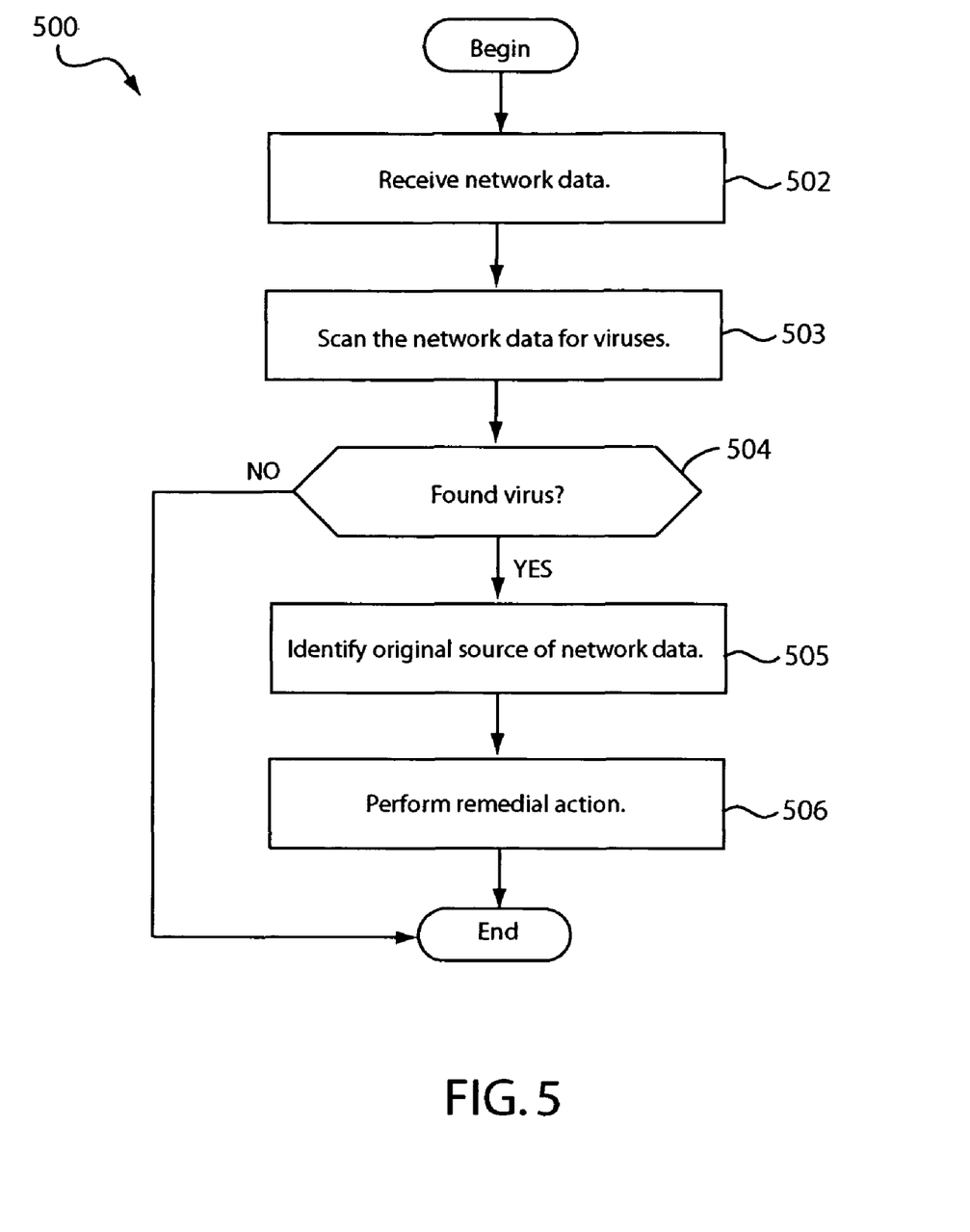
FIG. 5 shows a flow diagram of a method of identifying a virus infected computer sitting behind an address translation server in accordance with an embodiment of the present invention.

FIG. 5 shows a flow diagram of a method 500 of identifying a virus infected computer sitting behind an address translation server in accordance with an embodiment of the present invention. The method 500 is described herein using the components shown in FIG. 2 for illustration purposes only. It should be understood that the method 500 may also be performed using other components without detracting from the merits of the present invention.

In step 502, network data transmitted by a computer 110 through the NAT server 120 is received in the network traffic monitor computer 260.

In step 503, the network data is scanned for viruses using the antivirus module 264.

In steps 504 and 505, the computer 110 that originally sent the network data is identified if the network data contains a virus. In one embodiment, the identity of the computer 110 is determined from layer 7 data formed from the network data.

In step 506, remedial action is performed. In one embodiment, the traffic analyzer 261 informs the network administrator of the virus and the computer 110 that sent the virus by sending an e-mail or writing on an alert log. The network administrator may then perform virus scanning and removal on the identified computer 110.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method performed by a network traffic monitor apparatus of initially identifying a client computer that is located behind a Network Address Translation (NAT) server, the method comprising:
 the network traffic monitor apparatus receiving network data transmitted by the client computer through the NAT server, the network data being received after the NAT server replaces an original interne protocol (IP) address of the client computer with another IP address in the network data;
 the network traffic monitor apparatus determining a protocol of the received network data;
 the network traffic monitor apparatus parsing the received network data to extract application layer data which was unaffected by the NAT server; and
 the network traffic monitor apparatus determining the original IP address of the client computer from the application layer data which was parsed from the received network data without looking up the original IP address in a NAT table.

2. The method of claim 1 wherein the received network data comprises an e-mail transmitted in accordance with a Simple Mail Transfer Protocol (SMTP).

3. The method of claim 2 wherein the original IP address of the client computer is extracted from mail client trace information appended to the e-mail by a mail client running in the client computer.

4. The method of claim 3 further comprising:
 determining a machine name of the client computer from the mail client trace information.

5. The method of claim 1 further comprising:
 scanning the received network data for computer viruses.

6. The method of claim 5 further comprising:
 informing a network administrator of the original IP address of the client computer when the received network data is found to contain a computer virus.

7. A system comprising:
 a client computer configured to transmit network data over a computer network in accordance with an OSI seven-layer model, the client computer being located in a first computer network;
 a NAT server configured to replace an original IP address of the client computer in the network data with an IP address of the NAT server, the client computer being located behind the NAT server; and
 a traffic monitor computer configured to receive the network data after the network data is processed by the NAT server, the traffic monitor computer being configured to initially determine the original IP address of the client computer from layer 7 information of the network data without looking up the original IP address in a NAT table, the traffic monitor computer being located in a second computer network outside the first computer network.

8. The system of claim 7 wherein the traffic monitor computer maintains a listing of original IP addresses of client computers behind the NAT server.

9. The system of claim 7 wherein the traffic monitor computer maintains a listing of original IP addresses of client computers behind the NAT server and the IP address of the NAT server.

10. The system of claim 7 wherein the traffic monitor computer further includes an antivirus module for scanning the network data for computer viruses.

11. The system of claim 7 wherein the first computer network is a private computer network and the second computer network is a public computer network that includes the Internet.

12. A method performed by a network device of determining identification information of computers in a computer network, the method comprising:

the network device receiving network data, the network data having a public IP address instead of a private IP address of a client computer that originally sent the network data; and the network device initially determining the private IP address of the client computer from application layer information of the network data which was unchanged by a network translation address server without looking up the private IP address in a network address translation table.

13. The method of claim 12 wherein the application layer information of the network data is in accordance with the Simple Mail Transfer Protocol (SMTP).

14. The method of claim 13 wherein the private IP address of the client computer is extracted from mail client trace information included in the network data, the mail client trace information being generated by a mail client running in the client computer.

15. The method of claim 12 further comprising:

entering the private IP address of the client computer in a configuration table.

* * * * *

UNITED STATES PATENT AND TRADEMARK OFFICE
CERTIFICATE OF CORRECTION

| | | |
|---|---|---|
| PATENT NO. | : 8,145,733 B1 | Page 1 of 1 |
| APPLICATION NO. | : 11/355728 | |
| DATED | : March 27, 2012 | |
| INVENTOR(S) | : Cheng et al. | |

It is certified that error appears in the above-identified patent and that said Letters Patent is hereby corrected as shown below:

on column 8, line 18, after "original", replace "interne" with

-- internet --

Signed and Sealed this
Eighth Day of May, 2012

David J. Kappos
*Director of the United States Patent and Trademark Office*